March 20, 1934. R. C. McCLAY 1,951,762
FILM ADVANCING MECHANISM FOR MOTION PICTURE APPARATUS
Filed July 27, 1932
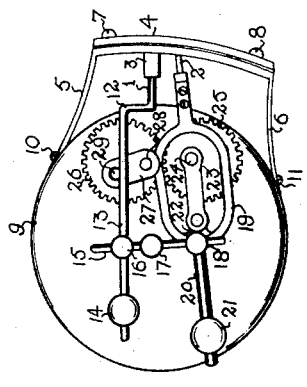
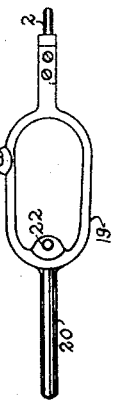
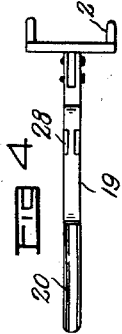
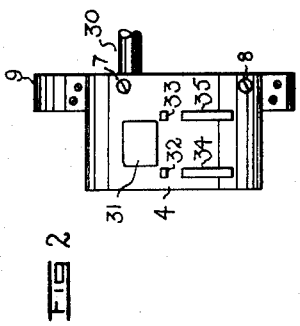
INVENTOR:
Roy C. McClay.
BY
Roy C. McClay  ATTORNEY.

Patented Mar. 20, 1934

1,951,762

UNITED STATES PATENT OFFICE 1,951,762

FILM ADVANCING MECHANISM FOR MOTION PICTURE APPARATUS

Roy C. McClay, Hollywood, Calif.

Application July 27, 1932, Serial No. 624,918

4 Claims. (Cl. 88—18.4)

The invention relates to film advancing mechanism for imparting a step-by-step movement to a motion picture film.

An object of the invention is to provide a simple mechanical movement, avoiding the use of cams which wear out and are expensive to replace, and also to substantially avoid a sawing movement of the shuttle fork at the limits of its movement as this would puncture the film adjacent the apertures therein. In avoiding the use of cams, applicant employs operating members having cylindrical bearing surfaces whereby a very quiet operation of the film advancing mechanism is obtained.

These objects are further accomplished by operating the shuttle fork, and the register pin also, if desired, by means of a plurality of link members, one of which serves to move the shuttle fork along the film gate and the other of which serves to insert the shuttle fork into and retract it from the film apertures, these link members and the eccentrics which operate them being so related that at the limit of movement of the shuttle fork, it is inserted or retracted without being moved substantially along the film gate whereby a sawing movement thereof is substantially prevented.

For further details of the invention reference may be made to the drawing, wherein:

Fig. 1 is a side elevation of the intermittent film advancing mechanism and a film guide plate therefor.

Fig. 2 is a front elevation of the mechanism showing the film gate.

Fig. 3 is a side elevation of the shuttle fork or yoke, embodying the pull-down pins of the invention.

Fig. 4 is a plan view of the shuttle fork of Fig. 3.

Referring more particularly to the drawing, in the operation of a motion picture camera it is essential that the register pins 1 (Fig. 1) enter a perforation in the film (not shown) consecutively with the withdrawal from the film of the pull-down pins 2, so that the film will be held stationary while the pull-down pins 2 are returned to a position where they once again engage the film.

It is desirable that this interval of time during which the film is held stationary, should be as long as conveniently possible so that the negative film in a camera may be properly exposed by allowing a wide-angle shutter opening, and so that a picture may be completely and perfectly projected when the device is used in a motion picture projector.

Also, it is eminently desirable that the register pins 2 should enter and leave a perforation in the film in a perfectly straight line therewith at right angles to the film, whereby any sawing motion, which destroys the edges of a perforation and eventually breaks through the edge of the film, may be eliminated.

In order to effect such a movement, housing 3 is mounted upon a film guide plate 4 to receive the register pins 1 and to allow them to move only in a straight line, at right angles to the line of movement of the film.

The plate 4 is held in place by means of the two outwardly extending arms 5 and 6 which are fastened at one end to the plate 4 by means of the screws 7 and 8 and to the supporting base 9 by the screws 10 and 11. The register pins 1 are suitably fastened to a depending bracket 12, which forms the inner edge of a fork (not shown).

Fastened to the center of the bracket 12 is a rod or shaft 13, supported by a slide bearing 14 mounted on the plate 9. The register pins 1 are reciprocated by means of a link 15, slidably mounted in a rocker bearing 16, fastened to the rod 13 at a point between the slide bearing 14 and the bracket 12.

Link 15 is supported by a rocker bearing 17 mounted on the plate 9 and is pivotally connected at its lower extremity to a slide bearing 18 fastened to a shuttle fork or yoke 19. The link member 15 rocks about the bearing 17 as a pivot point, the sliding connection 16 being above the pivot point 17 and the sliding connection 18 being below the pivot point 17. Thus, it will be seen that the link member 15 above the pivot point 17 follows the motion imparted to the shuttle fork 19 and imparts this motion to the register pins 1, through the rocker bearing 16 and the rod 13.

The shuttle fork 19 (Figs. 1 and 3) is in the form of a yoke. Extending from one side of the fork 19 is a shaft 20 which is pivotally supported by a rocker bearing 21, about which point the shuttle fork 19 pivots. The bearing 21 is mounted on the supporting base 9 away from the bearing 18 and the pull-down pins 2. In front of the bearing 18, the fork 19 extends in substantially an elongated O shape.

At one end of the O in fork 19 is an inwardly extending boss 22, adjacent the bearing 18 to which is pivotally fastened a link member 23. The opposite end of the link member 23 is pivotally journalled to a pin member 24, eccentrically mounted on a gear 25. Gear 25 meshes with a second gear 26 mounted above gear 25. These gears may be of fabric or suitable helical gears in order to eliminate the possibility of noise or they may be entirely dispensed with as will be easily understood by those skilled in the art.

A link member 27 is pivotally fastened at one end to a boss extension 28 on the fork 19 and at its other end is journalled to a pin member 29, eccentrically mounted on the gear 26. The link members 23 and 27 and their respective eccentrics 25 and 26 are so related, that each link member imparts minimum movement to the shuttle fork 19, when the other link member imparts maximum movement to fork 19. In other words, the pins 2 will enter and be drawn out of the film sprocket holes when the points 28, 27 and the center of the gear 26 form substantially a straight line, and so that a line between the axis of rotation of the eccentrics 25 and 26 is substantially at right angles to a line joining the axis of rotation of eccentric 25 and the center of rotation of bearing 21.

Thus, it will be seen that the pins 2 will enter and be withdrawn from the film practically at right angles thereto, so that a sawing motion may be substantially eliminated.

Similarly, when the link member 27 is imparting its maximum movement, either up or down, to the shuttle fork 19, the points 22, 24 and the center of the gear 25 are substantially in a straight line, whereby a minimum amount of movement is imparted to the pins 2 by means of the link 23.

By locating the center of rotation of the link member 23 at a distance from the pins 2, a long, narrow arc of travel is imparted to the pins 2, which means that they move substantially in a straight line, parallel to the film plate 4.

The gear 26 is positively driven by means of a shaft 30 fastened thereto (Fig. 2) which in turn drives the rest of the mechanism. The plate 4 has a film gate aperture 31, apertures 32 and 33 for the register pins 1 and apertures 34 and 35 for the pull-down pins 2, as is well understood.

It will be obvious that various modifications, such as a different film gate or a mutilated yoke member, may be introduced without departing from the inventive spirit herein conceived.

Having thus described the invention, what is claimed as new and desired to secure by Letters Patent is:

1. Film advancing mechanism comprising a shuttle fork, an operating member therefor, a plurality of eccentrics, a link member connected at one end to said operating member and at the other end to one of said eccentrics, another link member connected at another point to said operating member and to another of said eccentrics, said link members and eccentrics being so related that one of said eccentrics and its associated link member imparts minimum movement to said shuttle fork when another eccentric and its associated link member imparts maximum movement to said shuttle fork, whereby a sawing movement of said shuttle fork at the limits of its movement is substantially prevented.

2. Film advancing mechanism comprising a shuttle fork, an operating member therefor, a fixed slide bearing for said member, a plurality of eccentrics, a link member connected at one end to said operating member and at the other end to one of said eccentrics, another link member connected at another point to said operating member and to another of said eccentrics, said link members and eccentrics being so related that each of said eccentrics and its associated link member imparts minimum movement to said shuttle fork when the other eccentric and its associated link member imparts maximum movement to said shuttle fork, whereby a sawing movement of said shuttle fork is substantially prevented.

3. Film advancing mechanism comprising a shuttle fork, an operating member therefor, a fixed slide bearing for pivotally supporting said member, a plurality of inter-meshing gears, a link member connected at one end to said operating member and at the other end eccentrically to one of said gears, a second link member connected at another point to said operating member and eccentrically to a second of said gears, said link members being so related that each link member imparts minimum movement to said shuttle fork when the other link member imparts maximum movement to said shuttle fork and vice versa, whereby a sawing movement of said shuttle fork, at the limits of its movement, is substantially prevented.

4. Film advancing mechanism comprising a shuttle fork, an operating member therefor, a stationary slide bearing for said operating member, an eccentric for reciprocating said shuttle fork substantially horizontally, a link connected at one end to said eccentric and at the other end to said operating member, another eccentric for reciprocating said shuttle fork substantially vertically, a link member connected at one end to said second-mentioned eccentric and at the other end to said shuttle fork, said eccentrics and said slide bearing being so related that a line between the axis of rotation of said eccentrics is substantially at right angles to a line joining the axis of rotation of said first-mentioned eccentric and said slide bearing.

ROY C. McCLAY.